(12) United States Patent
Larue

(10) Patent No.: US 10,999,982 B2
(45) Date of Patent: May 11, 2021

(54) SYSTEM AND METHOD FOR INTEGRATED USE OF FIELD SENSORS FOR DYNAMIC MANAGEMENT OF IRRIGATION AND CROP INPUTS

(71) Applicant: Valmont Industries, Inc., Omaha, NE (US)

(72) Inventor: Jacob L. Larue, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 125 days.

(21) Appl. No.: 16/171,496

(22) Filed: Oct. 26, 2018

(65) Prior Publication Data
US 2019/0133058 A1 May 9, 2019

Related U.S. Application Data

(60) Provisional application No. 62/581,136, filed on Nov. 3, 2017.

(51) Int. Cl.
| | | |
|---|---|---|
| *A01G 25/16* | (2006.01) | |
| *G05D 7/06* | (2006.01) | |
| *A01G 15/00* | (2006.01) | |
| *A01G 25/09* | (2006.01) | |

(52) U.S. Cl.
CPC ............ *A01G 25/16* (2013.01); *A01G 15/00* (2013.01); *A01G 25/092* (2013.01); *A01G 25/167* (2013.01); *G05D 7/0635* (2013.01)

(58) Field of Classification Search
CPC ...... A01G 25/16; A01G 15/00; A01G 25/092; A01G 25/167; G05D 7/0635
See application file for complete search history.

(56) References Cited

U.S. PATENT DOCUMENTS

| | | | | |
|---|---|---|---|---|
| 3,976,101 A | * | 8/1976 | Bassett .................. | G04C 23/18 |
| | | | | 137/624.2 |
| 5,471,056 A | * | 11/1995 | Prelat ...................... | G01V 8/02 |
| | | | | 250/252.1 |
| 5,850,620 A | | 12/1998 | Skotnikov et al. | |
| | | (Continued) | | |

OTHER PUBLICATIONS

Kim et al. 'Remote Sensing and Control of an Irrigation System Using a Distributed Wireless Sensor Network' IEEE Transactions on Instrumentation and Measurement, vol. 57 (2008).*

*Primary Examiner* — Bernard G Lindsay
(74) *Attorney, Agent, or Firm* — Milligan PC LLO

(57) ABSTRACT

The present invention provides a system for combining the use of near real-time and/or real-time data acquired from an array of single purpose or integrated sensors mounted on a mechanized irrigation machine. According to a preferred embodiment, the integrated sensor of the present invention preferably provides for the collection of a variety data. According to a further preferred embodiment, the integrated sensor suite of the present invention may preferably include internally mounted sensors within a common housing which preferably includes a spectrometer, a radiometer and sensors to measure temperature, rainfall, relative humidity and barometric pressure. According to a further preferred embodiment, the number of integrated sensors mounted on a mechanized irrigation machine may preferably be determined based on a detected number of management zones and/or a detected location.

15 Claims, 5 Drawing Sheets

(56) References Cited

U.S. PATENT DOCUMENTS

| | | | |
|---|---|---|---|
| 6,052,187 A | 4/2000 | Krishnan et al. | |
| 6,484,652 B1 | 11/2002 | Colburn, Jr. | |
| 6,608,672 B1 | 8/2003 | Shibusawa et al. | |
| 6,750,898 B1 | 6/2004 | Ishida et al. | |
| 7,188,450 B2 | 3/2007 | Raun et al. | |
| 7,910,876 B2 | 3/2011 | Kumagai et al. | |
| 8,204,689 B2 | 6/2012 | Christy et al. | |
| 8,822,904 B2 | 9/2014 | Hayashi et al. | |
| 9,026,316 B2 | 5/2015 | Holland | |
| 9,408,342 B2 | 8/2016 | Lindores | |
| 9,585,307 B2 | 3/2017 | Holland | |
| 9,638,678 B2 | 5/2017 | Shriver et al. | |
| 2002/0105437 A1* | 8/2002 | Pollak | A01G 25/092 340/870.28 |
| 2008/0034859 A1* | 2/2008 | Runge | G01W 1/14 73/170.21 |
| 2011/0113030 A1* | 5/2011 | Hunter | G16B 5/00 707/736 |
| 2012/0056090 A1* | 3/2012 | Dolce | G01J 1/0271 250/338.3 |
| 2012/0297674 A1 | 11/2012 | MacKenzie | |
| 2014/0225747 A1* | 8/2014 | Abts | H04Q 9/00 340/870.11 |
| 2014/0346319 A1 | 11/2014 | Holland | |
| 2015/0061888 A1 | 3/2015 | Lankford et al. | |
| 2016/0037709 A1 | 2/2016 | Sauder et al. | |
| 2016/0088807 A1* | 3/2016 | Bermudez Rodriguez | A01G 25/16 700/284 |
| 2016/0116632 A1 | 4/2016 | Stoller et al. | |
| 2016/0219805 A1* | 8/2016 | Romney | A01G 25/16 |
| 2016/0299061 A1* | 10/2016 | Goldring | G08C 17/02 |
| 2016/0340856 A1* | 11/2016 | Conner | E02D 31/06 |
| 2017/0061052 A1* | 3/2017 | Gates | A01G 25/167 |
| 2018/0325051 A1* | 11/2018 | De Mello Brandao | A01G 7/00 |

* cited by examiner

SYSTEM AND METHOD FOR INTEGRATED USE OF FIELD SENSORS FOR DYNAMIC MANAGEMENT OF IRRIGATION AND CROP INPUTS

RELATED APPLICATIONS

The present application claims priority to U.S. Provisional Application No. 62/581,136 filed Nov. 3, 2017.

BACKGROUND AND FIELD OF THE PRESENT INVENTION

Field of the Present Invention

The present invention relates generally to a system and method for irrigated crop management and, more particularly, to a system and method for the integrated use of field sensors mounted on a mechanized irrigation machine for dynamic management of irrigation and crop inputs.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote and independent power for a variety of sensors, sprayers, drive control systems, motors and transducers.

Modern irrigation machines allow operators to apply required amounts of applicants (e.g. water or chemicals) over large areas, very quickly to the soil and/or crop. In doing so, it is important for the operator to know as much as possible regarding soil water content levels, temperatures, humidity and crop conditions. Applying applicants improperly is both expensive, potentially damaging to the target crop and could pose environmental threats. To avoid this pitfall, operators must continually monitor their fields.

Accurate and efficient monitoring of a given field is a significant challenge for operators. For example, soil water levels in a field are determined by utilizing manual methods (i.e. digging a hole and assessing soil moisture visually or by how the soil feels in the hand) or various types of instruments installed in the field. In most cases, the soil water content data is not easily transferred into a useable form for decision making by the irrigation equipment operator. Further, manually monitoring soil water content is time consuming and does not provide a good view of the soil water content status across an entire field. Further, to do a good job of soil water content monitoring in many fields requires three, four or more soil water content sensors at various depths or, if collecting manually, a lot of walking. In either case, water content data in present systems is not readily available for use by owners or operators, nor is it in an easy to use form. The same holds true for data regarding crop health, temperature, precipitation, wind levels, humidity and the like.

Prior art systems have attempted to provide combinations of sensors to provide accurate and convenient data for operators. For example, U.S. Pat. No. 6,484,652 teaches a soil sensing method for an agricultural vehicle which includes collecting samples by penetrating a ground engaging tool into soil and applying voltage/current to the soil. However, this system requires penetration of soil and specific measurement procedures. Similarly, U.S. Pat. No. 8,822,904 teaches plant sensors for determining plant growing conditions. However, this system is strictly limited to the use of optical sensors for monitoring crops. Still further, U.S. Pat. No. 9,026,316 teaches an apparatus for dispensing nutrients which includes a variable rate controller that is programmed to determine a primary nutrient application rate and an additional nutrient boost rate. However, this system is limited to controlling sprays for chemicals and nutrients.

To overcome the limitations of the prior art, a reliable and effective system is needed for the integrated use of field sensors mounted on a mechanized irrigation machine for dynamic management of irrigation water and other crop inputs.

SUMMARY OF THE PRESENT INVENTION

To address the shortcomings presented in the prior art, the present invention provides a system for combining the use of real-time or near real-time data acquired from an array of integrated sensors mounted on a mechanized irrigation machine. According to a preferred embodiment, the integrated sensor of the present invention preferably provides for the collection of a variety of data. According to a further preferred embodiment, the integrated sensor suite of the present invention may preferably include internally mounted sensors within a common housing which preferably includes a spectrometer, a radiometer and sensors to measure temperature, rainfall, relative humidity, barometric pressure, solar radiation and other climatic factors. According to a further preferred embodiment, the number of integrated sensors mounted on a mechanized irrigation machine may preferably be determined based on a detected number of management zones of interest and/or a detected location. According to a further preferred embodiment, integrated sensor(s) of the present invention may preferably provide specific data of current field conditions and send the detected data to a central control (either located at the pivot point or in the cloud) to apply the appropriate analytics to determine crop health, crop water use and crop water stress. Further, RGB or thermal images may also be used. In addition, NDVI, EVI and a variety of other indices may preferably be calculated as indicators of the crop health status. According to a further preferred embodiment, the analytics applied in accordance with the present invention may preferably process, combine and evaluate the data collected, update the water balance and generate irrigation and crop management recommendations such as variable rate prescriptions.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
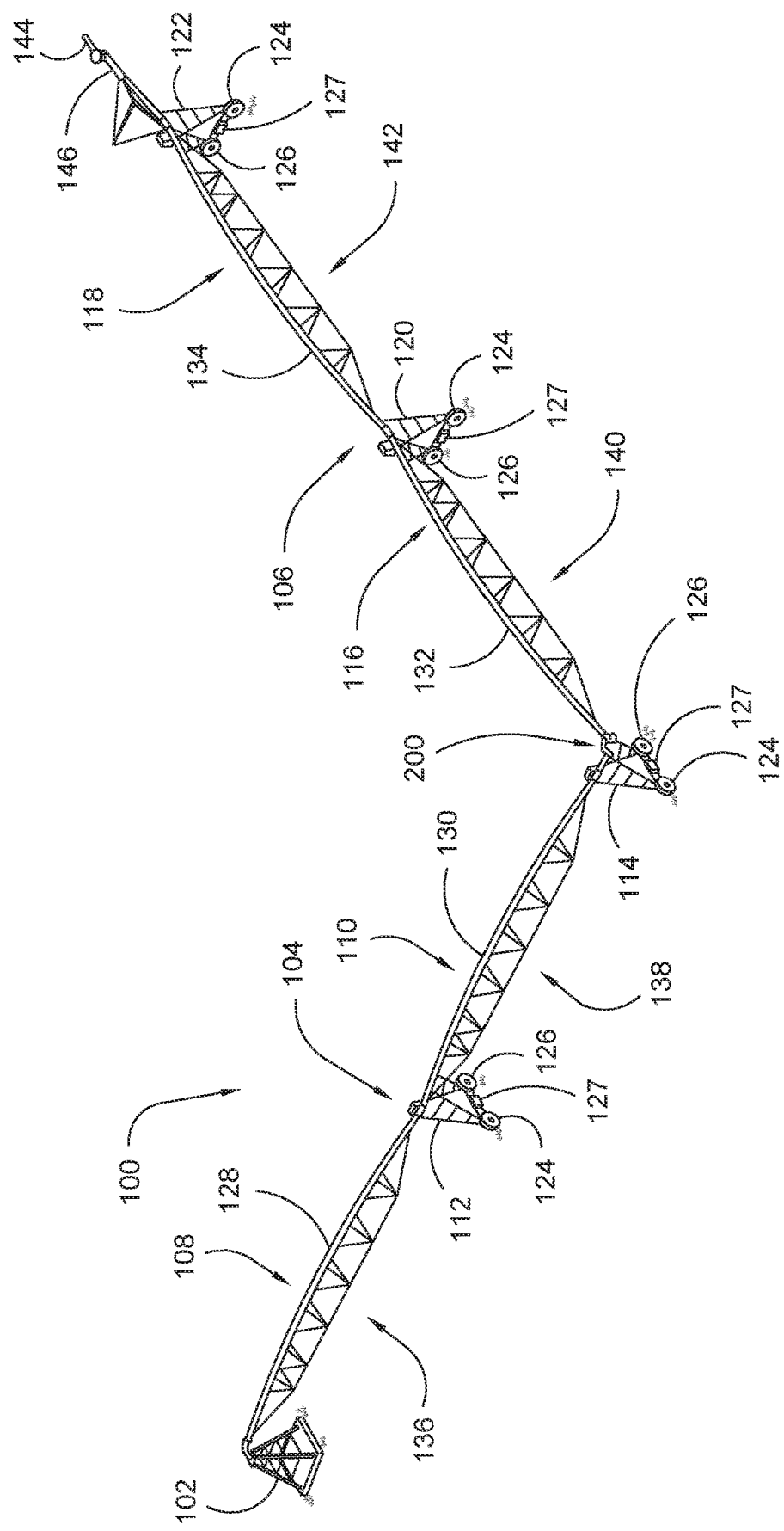
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom and that maintain the data stored to allow the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention. Further, all data processing, storage and algorithms/steps discussed herein may be performed on remote servers or processors such as via the cloud or the like without limitation.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; stationary systems; corner systems) may be used with the present invention without limitation.

As shown in FIG. 1, an exemplary irrigation system 100 may include a center pivot structure 102, a main section assembly 104 (main irrigation section assembly) coupled (e.g., connected) to the center pivot structure 102, and an extension section assembly 106 (extension irrigation section assembly) coupled to the main section assembly 104. This exemplary system is sometimes referred to as a "bender" since the extension assembly may be able to pivot or "bend" around an end point of the main section assembly 104 at given point 200.

As further shown in FIG. 1, the center pivot structure 102 has access to a well, a water repository (e.g., water tank), or other source of fluids, to furnish water to the irrigation system 100. For instance, the well may be located under the center pivot structure 102. In another instance, the well may be in close proximity to the cultivation area (e.g., field). The source of fluids may be coupled to a repository or other source of agricultural products to inject fertilizers, pesticides, and/or other chemicals into the fluids to create an applicant for application during irrigation. In an implementation, the center pivot structure 102 may comprise a frame assembly (e.g., galvanized steel frame assembly or the like).

The main section assembly 104 generally includes a number of interconnected spans 108, 110 supported by a tower structure 112 and an end tower structure 114. The extension section assembly 106 also includes a number of interconnected spans 116, 118. As shown, these may be connected with a latching mechanism 200 and supported by a tower structure 120 and an end tower structure 122. It is understood that the main section assembly 104 and the extension section assembly 106 may include any number of spans and tower structures.

As further shown, each tower structure 112, 114, 120, 122 may generally further include wheels 124, 126 to assist traversing (e.g., pivoting) the articulating irrigation system 100 about a specified area. In an implementation, at least one of the wheels 124, 126 may be driven by a suitable drive unit 127 (e.g., drive motor), or the like, to assist in traversing the system 100 about the specified area. In an implementation, each drive unit 127 may be controlled by a stop system so that the drive unit 127 can be slowed or completely shut down in the event of the detection of an adverse circumstance. In another implementation, the irrigation system 100 may also include a stop box that powers off all drive units 127 driving the main section assembly 104. In this implementation, the drive units 127 driving the extension section assembly 106 would drive the extension section assembly 106 at an increased rate as compared to the main section assembly 104.

As shown in FIG. 1, each span 108, 110, 116, 118 includes conduits 128, 130, 132, 134 (e.g., pipes) that are configured to carry (e.g., transport, provide, and so forth) liquid (e.g., applicant) along the length of the system 100 to numerous applicant dispersion devices (e.g., water emitting devices, sprinklers, and so forth) to irrigate the desired area. The applicant dispersion devices may be disposed along the conduits 128, 130, 132, 134 to furnish applicant to the cultivation areas. Each conduit 128, 130, 132, 134 may be coupled to one another to allow fluid communication between each conduit. In an implementation, the conduits 128, 130, 132, 134 may be supported by truss-type frameworks (framework structures). As shown in FIG. 1, the extension section assembly 106 includes an end gun 144 mounted to the end tower structure 122. For example, the end gun 144 may be mounted to the end tower structure 122 via a suitable support structure 146, such as a boom structure, or the like. In an implementation, the end gun 144 is a suitable pressure sprayer configured to be activated at the corners of a field or other designated area to increase the amount of land that can be irrigated.

Figure 2:
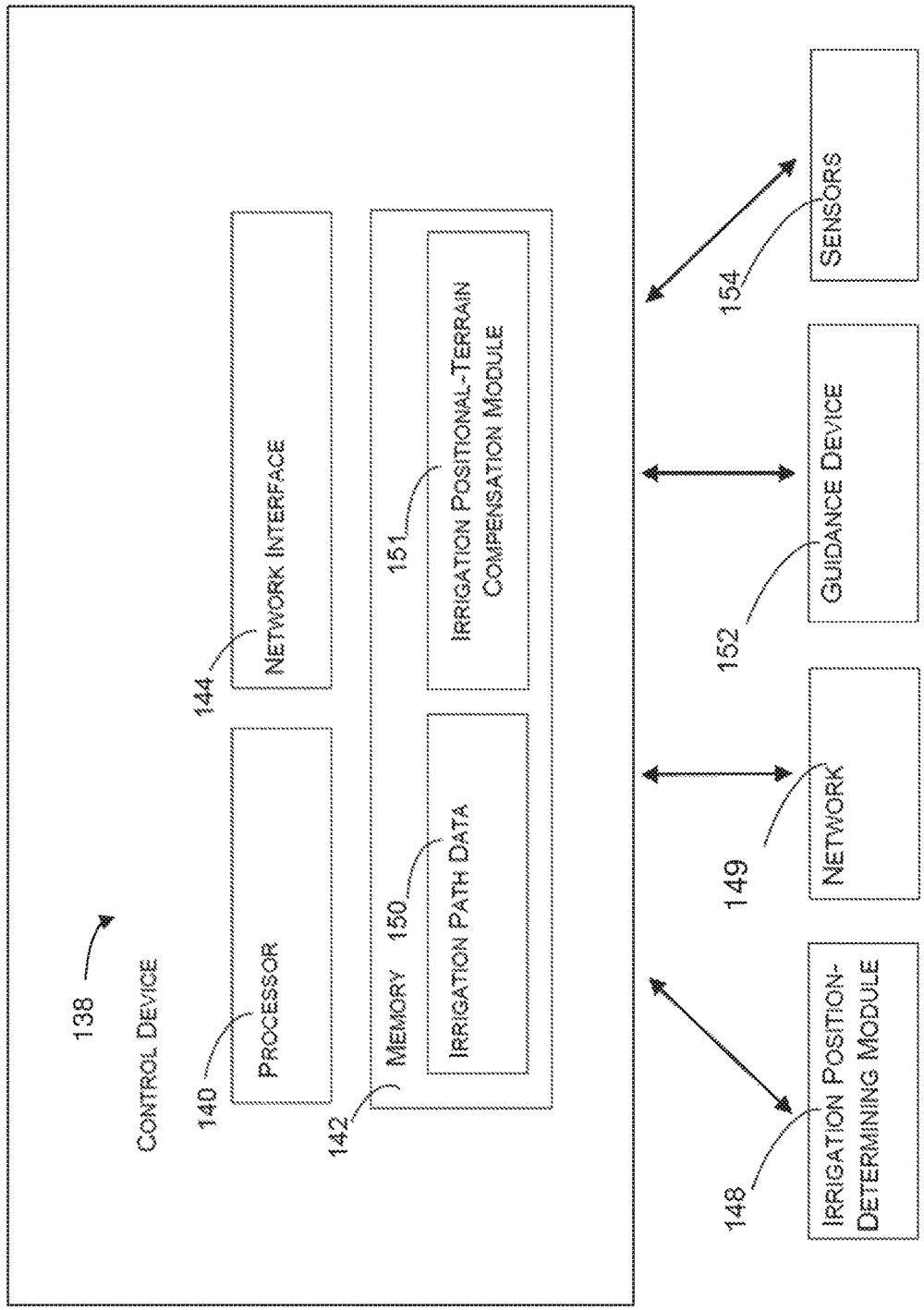
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a positioning module 151, a data storage module 150 and a network interface 144. The processor 140 provides processing functionality for the control device 138 and may include any number of processors, micro-controllers, or other processing systems such as remote processors in the cloud. The processor 140 may execute one or more software programs that implement techniques described herein. The memory 142 is an example of tangible computer-readable media that provides storage functionality to store various data such as the software program and code segments mentioned above, or other data to instruct the processor 140 and other elements of the control device 138 to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 provides functionality to enable the control device 138 to communicate with one or more networks 149 through a variety of components such as wireless access points, transceivers and so forth, and any associated software employed by these components (e.g., drivers, configuration software, and so on).

In implementations, exemplary control device 138 preferably may further include an irrigation position-determining module 148 which may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

Figure 3:
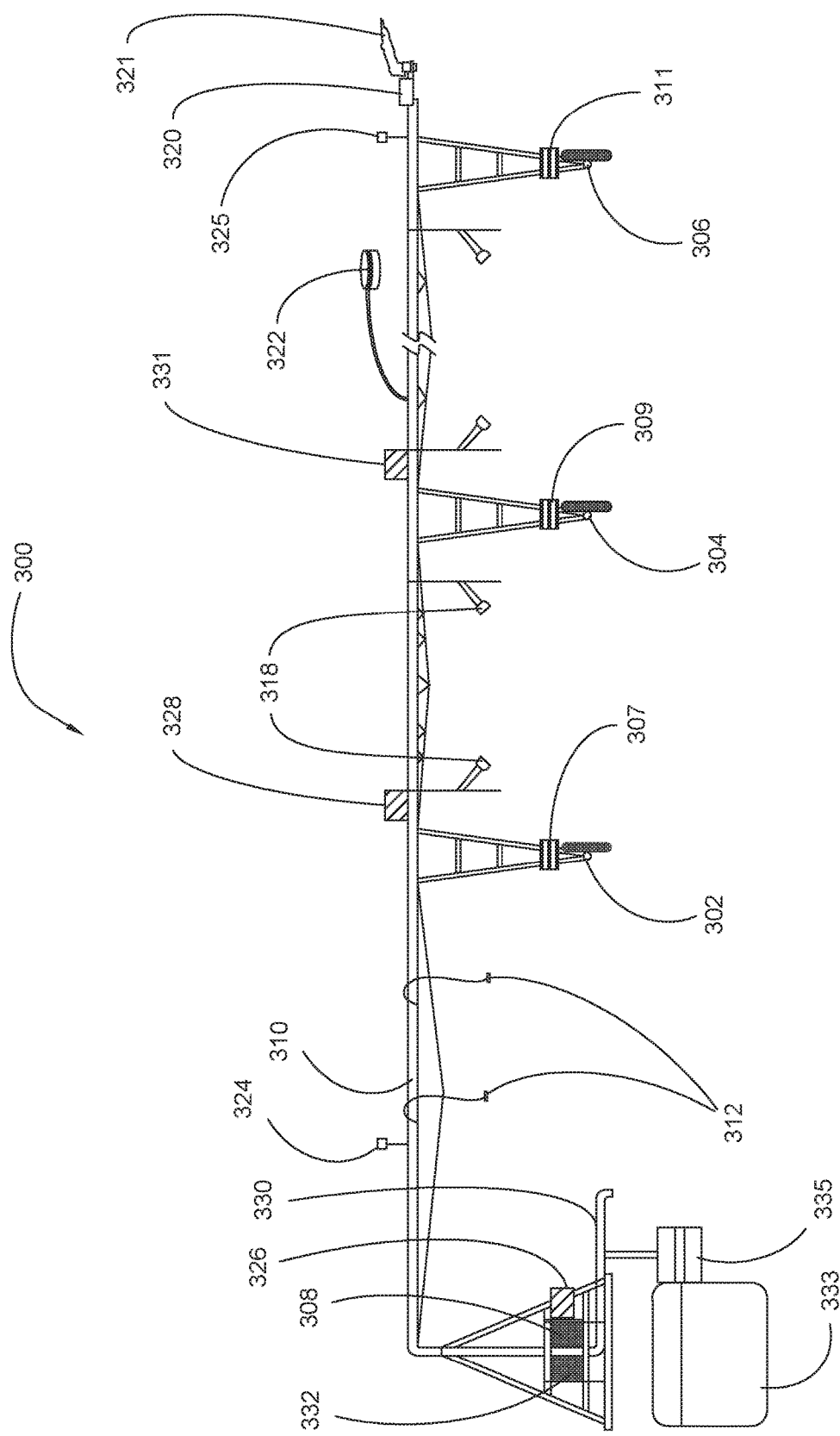
FIG. 3 shows a block diagram in accordance with further preferred embodiment of the present invention.

With reference now to FIG. 3, an exemplary system 300 incorporating aspects of the present invention shall now be further discussed. As shown, the system 300 may preferably be attached to a water source 330 or the like to supply water or applicants under pressure to the system 300. Additionally, the system may preferably be able to receive water or applicants under pressure from a tank or reservoir 333 via an injection pump 335 or the like. As further shown, an exemplary irrigation system 300 may include transducers 326, 328, 331 which are provided to monitor water pressure to sprinklers including the end gun 321 and other sprinkler heads 312. Further the system may preferably include respective drive units 307, 309, 311. As further shown, the respective drive units 307, 309, 311 preferably provide torque and braking to respective sets of drive wheels 302, 304, 306.

Further, the system 300 of the present invention may preferably further include a control/pivot panel 308 as well as elements such as a GPS receiver 320 for receiving positional data and a flow meter 332 for monitoring water flow in the system. Still further, a system of the present invention may further include indirect crop sensors 318 which may preferably include moisture sensors to determine the water content levels in a given area of soil. Additionally, the sensors 318 may further include optics to allow for the detection of crop type, stage of grown, health, presence of disease, rate of growth and the like. Still further, the system may include soil or plant sensors (not shown). Still further, the detection system may further receive data from a connected or remote weather station (not shown) or the like which is able to measure weather features such as temperature, solar radiation, humidity, wind speed, wind direction, pressure, precipitation, temperature and the like. Still further, the system may preferably further include a wireless transceiver/router 324, 325 for receiving and transmitting signals between system elements.

According to alternative preferred embodiments, the system may also use a power line carrier system or separate wired network to transmit signals between system elements. Further, the preferred system of the present invention may alternatively further include additional elements mounted to the span 310 such as additional sensors and the like. According to a further preferred embodiment, a system in accordance with the present invention may preferably further include an integrated sensor suite element 322 which preferably includes a combination of sensors and processing elements within a common housing. According to a further preferred embodiment, an exemplary integrated sensor suite element 322 may preferably be separately powered and internally managed as discussed further below.

Figure 4:
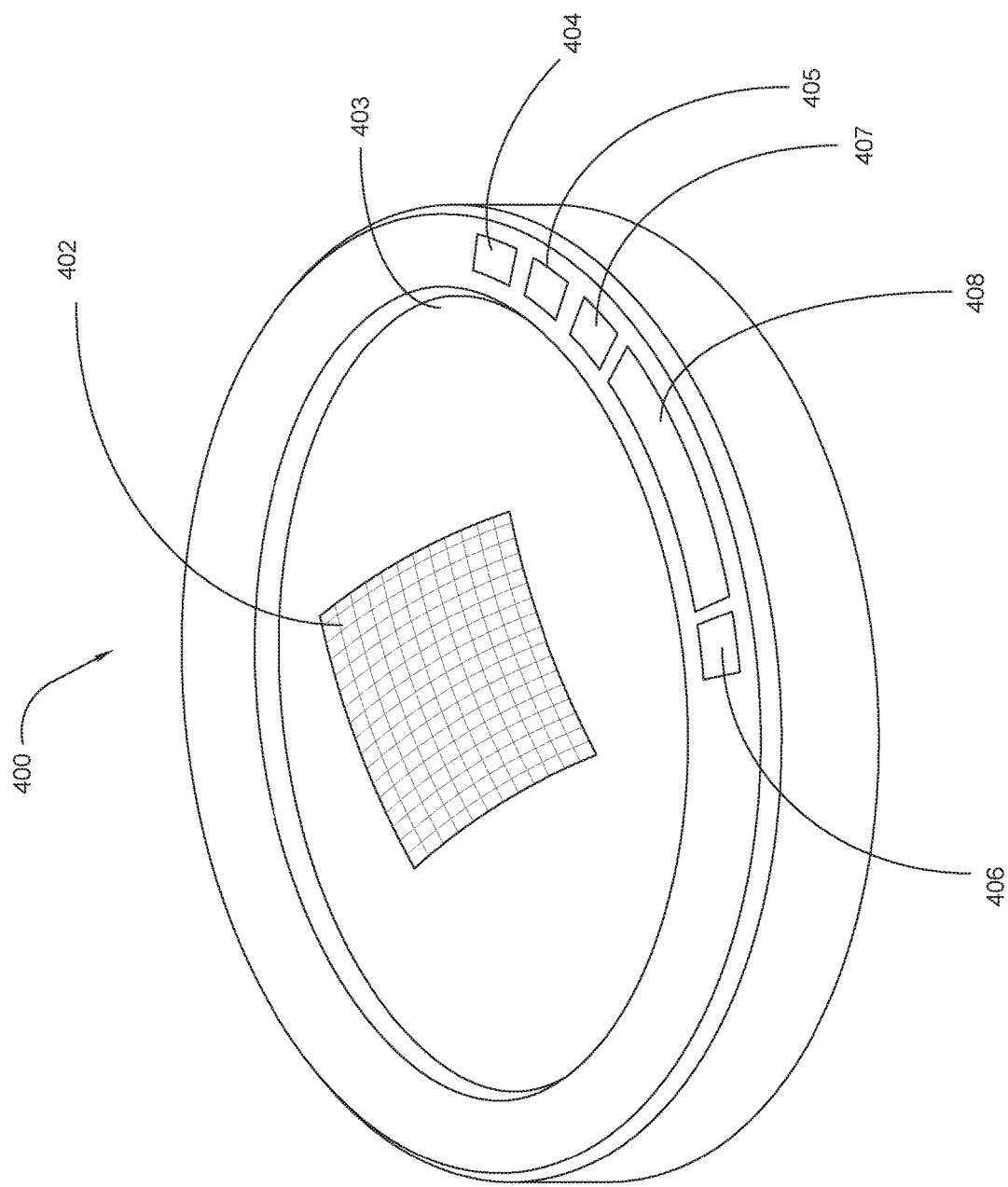
FIG. 4 shows an illustration of an exemplary sensor in accordance with a preferred embodiment of the present invention.

With reference now to FIG. 4, further aspects of the present invention shall now be further discussed. As shown in FIG. 4, an exemplary integrated sensor suite element 400 of the present invention may preferably include groups of integrated sensors, processors, and communication chips which may function separate and apart from the systems of the larger irrigation machine. Alternatively, the exemplary integrated sensor suite element 400 of the present invention may share processing and management functions with processors and sensors of the irrigation machine in order to provide redundancies and processing speed where needed.

As shown in FIG. 4, an exemplary integrated sensor suite element 400 of the present invention may preferably include a precipitation detector 403 which preferably may detect forms and rates of precipitation. According to a further preferred embodiment, the precipitation detector 403 may further include sensors to determine the drop size and distribution of detected rainfall, dew, hail and other types of precipitation. According to a further embodiment, the exemplary integrated sensor suite element 400 of the present invention may preferably further include an accelerometer 404 which may detect the tilt, orientation and acceleration of the sensor suite element 400. Still further, the sensor suite element 400 of the present invention may further include a GPS chip 405 which is preferably internal to the sensor suite element 400.

Still further, the sensor suite element 400 of the present invention may further include radiometers 407 to determine the long wave and short wave incoming solar radiation and photosynthetically active radiation. Additionally, an exemplary sensor suite element 400 of the present invention may further include a spectrometer 408. According to a preferred embodiment, the spectrometer may preferably be a seven-band spectrometer or the like. According to a preferred embodiment, the spectrometer may be placed on the bottom of the sensor suite element 400. Additionally, the exemplary sensor suite element 400 of the present invention may further include internal communications chips 406 to allow the sensor suite element 400 to communicate with a variety remote computers and servers. According to a preferred embodiment, the communication chips 406 may for example include: cellular, Wi-Fi, wireless local area networks (WLANs), Bluetooth, ZigBee, 802.11, and/or any other standards based or proprietary wireless protocols. According to another preferred embodiment, wired communication may also take place via IP protocols, TC/PIP, Power Line Carrier and/or any other standards-based or proprietary protocols and hardware. According to a still further preferred embodiment, the integrated sensor suite 400 may further include a solar panel 402 to separately power the sensor suite 400, or may be powered by other means such as utilizing electrical power provided by the irrigation machine.

Figure 5:
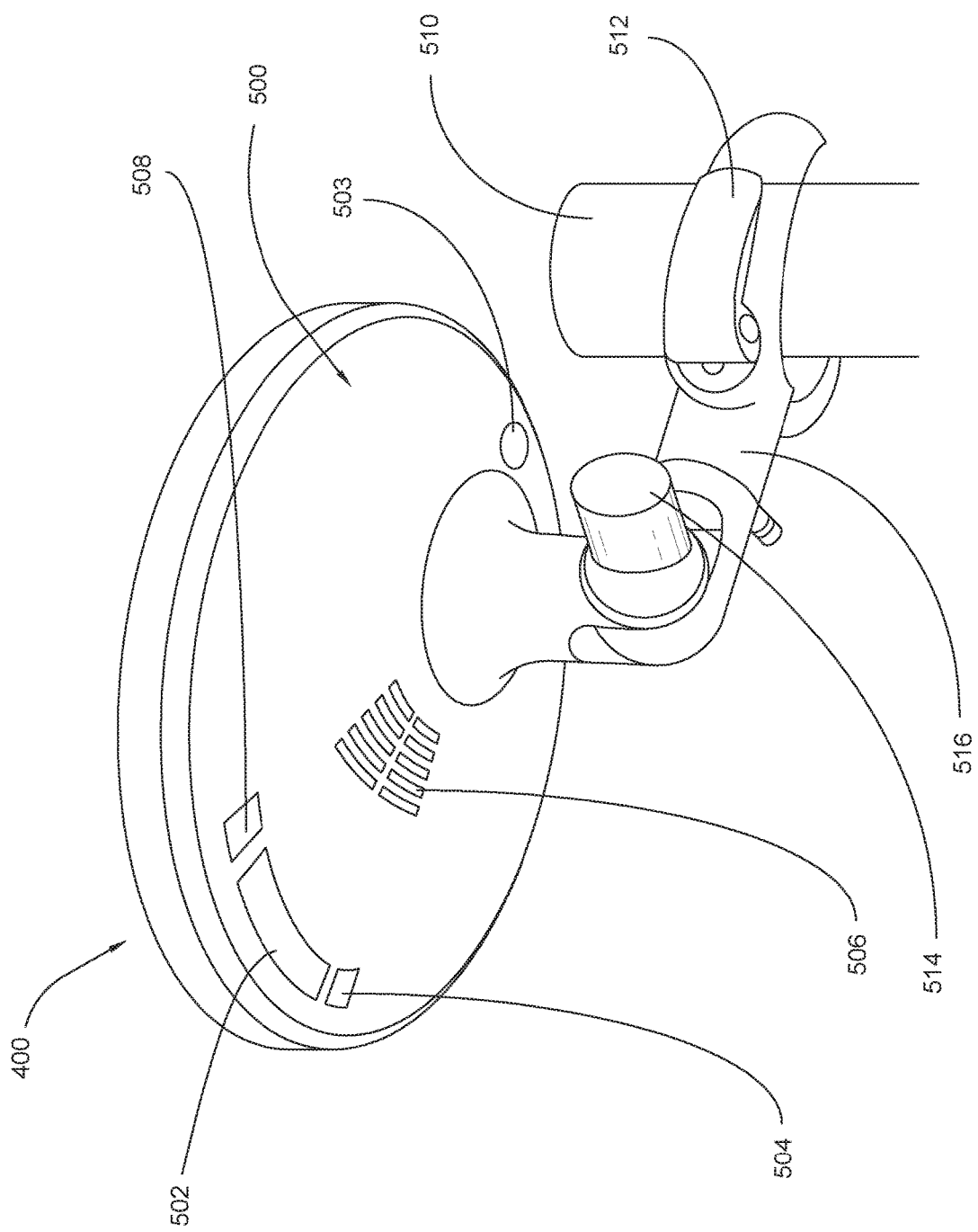
FIG. 5 shows an alternative view of an exemplary sensor in accordance with a further preferred embodiment of the present invention.

With reference now to FIG. 5, further aspects of the present invention shall now be further discussed. As shown in FIG. 5, the underside 500 of an exemplary integrated sensor suite element 400 (discussed above) may include additional and/or alternative sensor and communication elements. As shown, the exemplary integrated sensor suite element 400 may further include auxiliary sensing elements 503 which may include for example a soil moisture sensor, a camera, an infrared sensor and the like. According to a still further preferred embodiment, the integrated sensor suite 400 may further include air sensors 506 which may for example include sensors to detect air temperature, humidity, pressure and the like. According to still further preferred embodiments, the integrated sensor suite 400 may further include optical sensors 504 to detect crop health, crop water use, crop water stress index, plant production ratio and provide data to calculate other crop indices. According to a still further for environment, the optical sensors 504 may detect and obtain data to produce NDVI, EVI and a variety of other indices. As further shown in FIG. 5, further sensors such as an exemplary 4-way net radiometer 508 and spectrometer 502 may be incorporated into the underside 500 of the integrated sensor suite element 400. Further, other sensors (such as RGB sensors and the like) may be added and used without limitation.

As further shown in FIG. 5, the exemplary integrated sensor suite element 400 may preferably be mounted onto a span element 510. According to a preferred embodiment, the sensor suite element 400 may be secured to a span element 510 using a clamp or bracket 512 which preferably includes a connecting arm 516. According to a further preferred embodiment, the sensor suite element 400 may preferably be connected to the connecting arm 516 using an adjustable knob 514 which is able to lock and loosen to allow for the proper positioning for the sensor suite element 400.

According to a further preferred embodiment, the number of integrated sensors mounted on a mechanized irrigation machine may preferably be determined based on a detected or pre-determined number of management zones and/or location(s). According to a further preferred embodiment, integrated sensor(s) of the present invention may preferably provide specific data of current field conditions and send the detected data to a central control to apply the appropriate analytics to determine calculate crop health, crop water use, crop water stress index and the like. In addition, NDVI, EVI and a variety of other indices may preferably be calculated. According to a further preferred embodiment, the analytics applied in accordance with the present invention may preferably process, combine and evaluate the data collected, update the water balance and generate irrigation and crop management recommendations including but not limited to when to apply, what to apply (such as water, fertilizer, crop protection chemicals and the like), how much to apply and specifically where in the field to apply. According to further preferred embodiments, the system of the present invention may preferably be configured to automatically implement a variable rate irrigation or applicant prescription to a given field based on the sensed data during the current pass of the machine or during a subsequent pass of the irrigation machine.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for providing sensing and communications within an irrigation system having at least one span and a drive system for moving the span, wherein the system comprises:
    a plurality of sprinkler heads, wherein the plurality of sprinkler heads are configured to receive applicants under pressure and spray the applicants onto a field to be irrigated;
    a GPS receiver for receiving positional data;
    a flow meter for monitoring water flow to the plurality of sprinkler heads; and
    an integrated sensor suite element, wherein the integrated sensor suite element is comprised of a plurality of sensors within a single sensor housing; further wherein the integrated sensor suite element is further comprised of a plurality of communication elements;
    further wherein the integrated sensor suite element is comprised of a central power bus; further wherein the plurality of sensors and plurality of communication elements are electrically connected to the central power bus;
    further wherein the plurality of sensors comprise a precipitation detector and at least three sensors selected from the group of sensors including: an accelerometer, a GPS chip, a radiometer, a RGB sensor, and a spectrometer;
    further wherein the plurality of communication elements comprise chips which provide communications using at least two protocols selected from the group of protocols comprising: cellular, Wi-Fi, WLAN, Bluetooth, Zig-Bee, Sigfox, LoRa, LTE-M and 802.11, TCP/IP and Power Line Carrier;

wherein the system further comprises a crop sensor separately mounted on the span; wherein the crop sensor is configured to detect and transmit crop data;

wherein the integrated sensor suite element further comprises a sensor controller; wherein the sensor controller is configured to receive data from the plurality of sensors; further wherein the sensor controller is further configured to transmit control instructions to the plurality of sensors;

wherein the integrated sensor suite element is further configured to control, transmit and received data to and from the plurality of communication elements; wherein the integrated sensor suite element is configured to receive, transmit and process data using processing resources exclusively within the integrated sensor suite element;

wherein the integrated sensor suite element is configured to transmit processed data to remote processors;

wherein the precipitation detector is configured to detect forms and rates of precipitation;

wherein the system includes at least one wireless transceiver separately mounted on the span, the wireless transceiver receiving and transmitting signals between system elements comprising at least the integrated sensor suite and the crop sensor.

2. The system of claim 1, wherein the precipitation detector is configured to determine a droplet size of the detected precipitation.

3. The system of claim 2, wherein the integrated sensor suite element further comprises an accelerometer; wherein the accelerometer is configured to detect the tilt, orientation and acceleration of the sensor suite element.

4. The system of claim 3, wherein the GPS chip is housed within the single sensor housing.

5. The system of claim 4, wherein the radiometer is configured to detect levels of photosynthetically active radiation.

6. The system of claim 5, wherein the spectrometer is comprised of a seven-band spectrometer.

7. The system of claim 6, wherein the integrated sensor suite element further comprises sensors selected from the group of sensors comprising: a soil moisture sensor, a camera, and an infrared sensor.

8. The system of claim 7, wherein the integrated sensor suite element further comprises air sensors; wherein the air sensors are configured to detect air temperature, humidity and air pressure.

9. The system of claim 8, wherein the integrated sensor suite element further comprises optical sensors; wherein the optical sensors are configured to detect data indicating a condition selected from the group of conditions comprising: crop health, crop water use, crop water stress index, and plant production ratio.

10. The system of claim 9, wherein the optical sensors are further configured to detect data to produce Normalized Difference Vegetation Index (NDVI) and Enhanced Vegetation Index (EVI) calculations.

11. The system of claim 10, wherein the radiometer is comprised of a 4-way net radiometer.

12. The system of claim 11, wherein the radiometer and the spectrometer are integrated into an underside of the single sensor housing.

13. The system of claim 12, wherein the integrated sensor suite element is mounted onto the span; wherein the integrated sensor suite element is secured to the span with a connecting arm; further wherein the sensor suite element is connected to the connecting arm using an adjustable knob which is configured to lock and loosen.

14. The system of claim 13, wherein the integrated sensor suite element is configured to: process data, update system water balance, and generate irrigation and crop management recommendations.

15. The system of claim 14, wherein the integrated sensor suite element is configured to automatically generate a prescription for a variable rate prescription; further wherein the integrated sensor suite element is configured to transmit the generated prescription to a grower to accept, decline or modify in real time.

* * * * *